United States Patent
Johnson et al.

(10) Patent No.: US 12,466,320 B2
(45) Date of Patent: Nov. 11, 2025

(54) OPTICAL SYSTEMS FOR SIDE/REAR VIEW MIRROR OF A VEHICLE

(71) Applicant: 3M INNOVATIVE PROPERTIES COMPANY, St. Paul, MN (US)

(72) Inventors: Matthew B. Johnson, Woodbury, MN (US); John F. VanDerlofske, III, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 395 days.

(21) Appl. No.: 18/030,300

(22) PCT Filed: Sep. 17, 2021

(86) PCT No.: PCT/IB2021/058499
§ 371 (c)(1),
(2) Date: Apr. 5, 2023

(87) PCT Pub. No.: WO2022/079520
PCT Pub. Date: Apr. 21, 2022

(65) Prior Publication Data
US 2023/0373393 A1 Nov. 23, 2023

Related U.S. Application Data

(60) Provisional application No. 63/198,390, filed on Oct. 15, 2020.

(51) Int. Cl.
*B60R 1/08* (2006.01)
*G02B 5/22* (2006.01)
*G02B 5/28* (2006.01)

(52) U.S. Cl.
CPC ............... *B60R 1/083* (2013.01); *G02B 5/22* (2013.01); *G02B 5/285* (2013.01)

(58) Field of Classification Search
CPC .......... B60R 1/083; G02B 5/22; G02B 5/285; G02B 5/28; G02B 5/3041; G02B 5/305; G02B 5/26; G02F 1/133545
See application file for complete search history.

(56) References Cited

U.S. PATENT DOCUMENTS

| | | |
|---|---|---|
| 5,882,774 A | 3/1999 | Jonza et al. |
| 6,179,948 B1 | 1/2001 | Merrill et al. |

(Continued)

OTHER PUBLICATIONS

Bouma, "The Problem of■ Glare in Highway Lighting", Philips Technical Review, Aug. 1936, vol. 1, No. 8, pp. 225-230.
Bullough, "Discomfort and Disability Glare from Halogen and HID Headlamp Systems", Society of Automotive Engineers World Congress, Mar. 2002, pp. 1-7.

(Continued)

*Primary Examiner* — Angela M. Medich
(74) *Attorney, Agent, or Firm* — Christopher P. Tebow

(57) ABSTRACT

A mirror system for a side- or rear-view mirror of a vehicle includes a light absorbing layer and an optical film having a plurality of layers disposed on the light absorbing layer. For substantially normally incident light and a blue, green, and red wavelength range extending from about 420-485 nm, 525-575 nm and 625-740 nm, respectively, and for at least one polarization state, the plurality of layers includes a reflection band having a substantially flat top region at least 100 nm wide. The reflection band includes left and right band edges at respective short and long wavelength sides. The plurality of layers has an average optical reflectance R1 of greater than about 70% and a standard of deviation of less than about 5% in the substantially flat top region. An average optical reflectance Rb is less than about 0.8R1 in the blue wavelength range.

10 Claims, 6 Drawing Sheets

(56) References Cited

U.S. PATENT DOCUMENTS

| | | | |
|---|---|---|---|
| 6,783,349 | B2 | 8/2004 | Neavin et al. |
| 6,967,778 | B1 | 11/2005 | Wheatley et al. |
| 9,162,406 | B2 | 10/2015 | Neavin et al. |
| 2004/0095661 | A1 | 5/2004 | Chidichimo et al. |
| 2005/0079333 | A1 | 4/2005 | Wheatley et al. |
| 2012/0249935 | A1* | 10/2012 | Oya ................... B32B 27/36 359/488.01 |
| 2014/0192413 | A1 | 7/2014 | Kokeguchi |
| 2019/0391311 | A1 | 12/2019 | Nevitt et al. |
| 2020/0183065 | A1 | 6/2020 | Haag et al. |
| 2021/0063607 | A1* | 3/2021 | Amin ................ G02F 1/13362 |

OTHER PUBLICATIONS

Derlofske, "Effects of Vehicle Forward Lighting Spectrum on Glare", PAL Symposium Darmstadt University of Technology, 2003, pp. 1-11.

Derlofske, "Headlamp Parameters and Glare", Society of Automotive Engineers, 2004, pp. 1-9.

Flannagan, "A Field Study of Discomfort Glare from High-Intensity Discharge Headlamps", University of Michigan Transportation Research Institute Report No. UMTRI-92-16, Apr. 1992, pp. 1-14.

Flannagan, "Subjective and Objective Aspects of Headlamp Glare: Effects of Size and Spectral Power Distribution", University of Michigan Transportation Research Institute Report No. UMTRI-99-36, Nov. 1999, pp. 1-19.

International Search report for PCT International Application No. PCT/IB2021/058499, mailed on Dec. 21, 2021, 7 pages.

\* cited by examiner

OPTICAL SYSTEMS FOR SIDE/REAR VIEW MIRROR OF A VEHICLE

CROSS REFERENCE TO RELATED APPLICATIONS

This application is a national stage filing under 35 U.S.C. 371 of PCT/IB2021/058499, filed Sep. 17, 2021, which claims the benefit of U.S. Provisional Application No. 63/198,390, filed Oct. 15, 2020, the disclosures of which are incorporated by reference in their entireties herein.

TECHNICAL FIELD

The disclosure generally relates to optical systems, particularly optical systems for side-view and/or rear-view mirrors of vehicles.

BACKGROUND

Interior and exterior mirrors in a vehicle assist a driver of the vehicle to obtain a sighting of other automobiles and/or objects behind the vehicle while driving. During night driving, for instance, due to a bright reflection of the mirrors caused by, say, a headlight of an automobile or a street light behind the vehicle, the driver may experience a glare from the mirrors and may not be able to see forward of the vehicle. Anti-glare mirror systems are used to prevent such reflections and associated glares.

SUMMARY

Some aspects of the disclosure relate to a mirror system for use in a side- or rear-view mirror of a vehicle. The mirror system includes a substantially opaque light absorbing layer and an optical film disposed on the light absorbing layer. The optical film includes a plurality of layers numbering at least 10 in total, where each of the layers have an average thickness less than about 300 nm. For substantially normally incident light and a blue wavelength range extending from about 420 nm to about 485 nm, a green wavelength range extending from about 525 nm to about 575 nm and a red wavelength range extending from about 625 nm to about 740 nm, and for at least one polarization state, the plurality of layers includes a reflection band. The reflection band includes a substantially flat top region at least 100 nm wide and including at least one green wavelength in the green wavelength range and at least one red wavelength in the red wavelength range. The reflection band further includes a left band edge at a short wavelength side of the reflection band where the reflectance of the optical film generally increases with increasing wavelength. The reflection band further includes a right band edge at a long wavelength side of the reflection band where the reflectance of the optical film generally decreases with increasing wavelength. The plurality of layers has an average optical reflectance R1 of greater than about 70% and a standard of deviation of less than about 5% in the substantially flat top region and an average optical reflectance Rb of less than about 0.8R1 in the blue wavelength range.

Some other aspects of the disclosure relate to an optical stack including a light absorbing layer and an optical film disposed on the light absorbing layer. The optical film includes a plurality of layers numbering at least 10 in total, where each of the layers has an average thickness less than about 300 nm. For substantially normally incident light and non-overlapping blue, green and red wavelength ranges of a visible light spectrum, each of the wavelength ranges at least 30 nms wide, and for at least one polarization state, the plurality of layers includes a reflection spectrum. The reflection spectrum includes a full width at half maximum (FWHM), wherein the FWHM includes at least 80% of each of the green and red wavelength ranges and at most 20% of the blue wavelength range. The reflection spectrum includes a reflectance of at least 70% for at least one wavelength in each of the green and red wavelength ranges. The light absorbing layer absorbs at least 70% of the incident light for at least one wavelength in each of the blue, the green and the red wavelength ranges.

Other aspects of the disclosure relate to mirror systems for use in side- or rear-view mirrors of a vehicle including an optical stack.

BRIEF DESCRIPTION OF DRAWINGS

The various aspects of the disclosure will be discussed in greater detail with reference to the accompanying figures where, FIG. 1 schematically shows a vehicle having side and rear view mirrors having an optical stack according to some embodiments.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

It is well known that head lights of vehicles produce glare for other drivers when viewed from side- or rear-view mirrors. Attempts to modify the spectral output of the head lights have been made to reduce the glare but the issue still exists. Specifically, the "blue" light portion of the head light spectrum causes more discomfort than other contributions. Further high-intensity discharge (HID) headlamps result in greater discomfort than halogen headlamps when viewed in driving situations. Embodiments described herein address these and other challenges.

In some embodiments of the disclosure the spectral reflectance of MOF's incorporated into the side- or rear-view mirrors have been modified where the MOF's may be substantially reflective for green and red spectral wavelengths but substantially to partially transmissive for low wavelengths.

Figure 1:
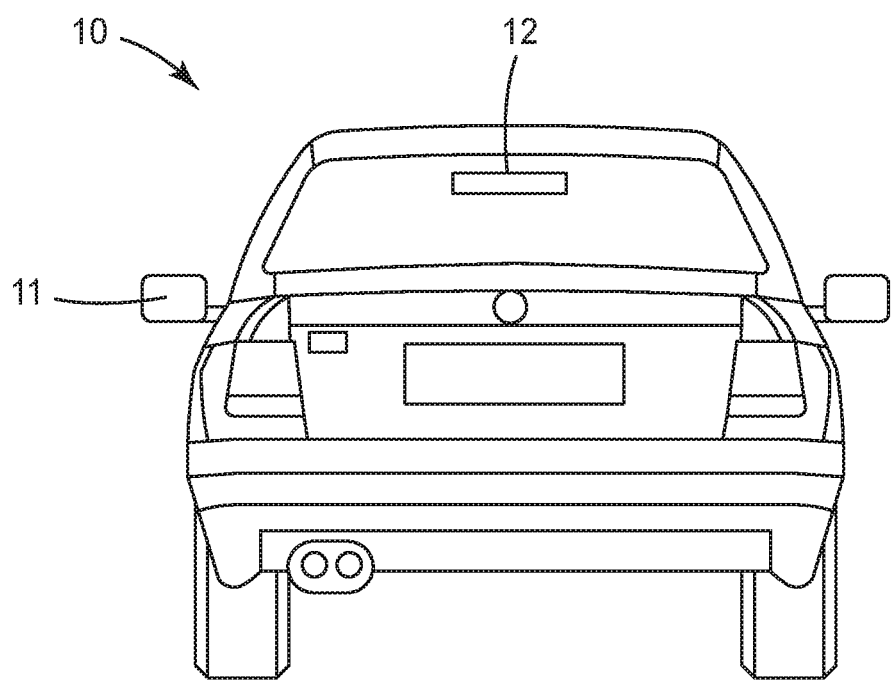

FIG. 1 shows an example of a vehicle (10) having a rear-view mirror (12) and side-view mirrors (11) to assist a driver of the vehicle to obtain a sighting of other automobiles and/or objects behind the vehicle while driving. The mirror system according to some aspects of the disclosure can be incorporated in the side- and/or rear-view mirrors (11, 12) of the vehicle (10).

Figure 2:
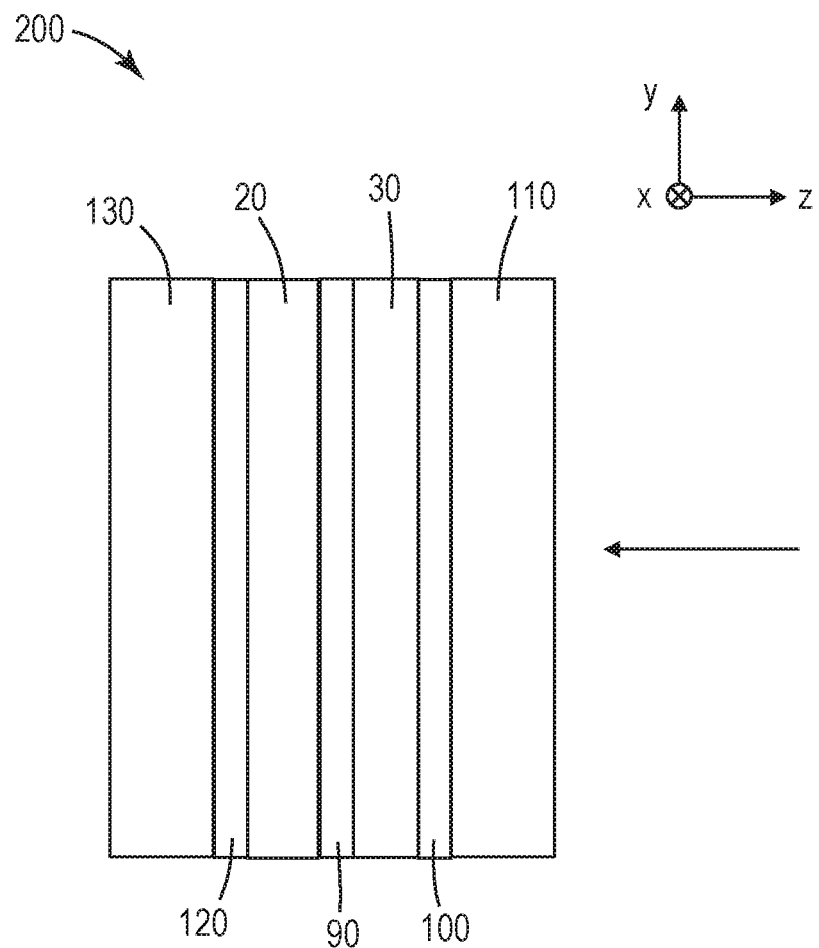
FIG. 2 schematically shows a mirror system according to some embodiments.

FIG. 2 illustrates a mirror system (200) according to some embodiments. The mirror system in some aspects may be an optical stack (200) and may include a light absorbing layer (20). In some aspects, the light absorbing layer may be opaque or substantially opaque. The light absorbing layer (20) helps controls ambient light rejection for the mirror system. In some embodiments, the light absorbing layer (20) may include one or more of a powder coating of carbon black, a black dye, an opaque particle, an organic or inorganic pigment or particle, or nanoparticles, or such a particle dispersed within a cured polymeric binder material. The particles that define the light absorbing layer (20) may be of a wide variety and shapes. For example, the material may be dispersed in a liquid or solid binder system. In one embodiment, the light absorbing layer (20) may include a clear binder having black particles dispersed throughout the clear binder. The binder may include, for example, an acrylate or other UV curable polymer. The light absorbing layer (20) may be applied by a conventional technique such as a coating process or powder coating. In some aspects, the light absorbing layer (20) may include a linear absorbing polarizer.

An optical film (30) may be disposed on the light absorbing layer (20). In some aspects, the substantially opaque light absorbing layer (20) and the optical film (30) may be bonded to each other using a first adhesive layer (90) disposed between the substantially opaque light absorbing layer (20) and the optical film (30).

The mirror system (200) may include a front protective layer (110) and a rear protective layer (130). The front and rear protective layers (110, 130) may, in some embodiments, include glass. In some aspects the optical film (30) and the front protective layer (110) may be bonded to each other using a second adhesive layer (100) disposed between the optical film (30) and the front protective layer (110). In some aspects, the light absorbing layer (20) and the rear protective layer (130) may be bonded to each other using a third adhesive layer (120) disposed between the light absorbing layer (20) and the rear protective layer (130).

Figure 3:
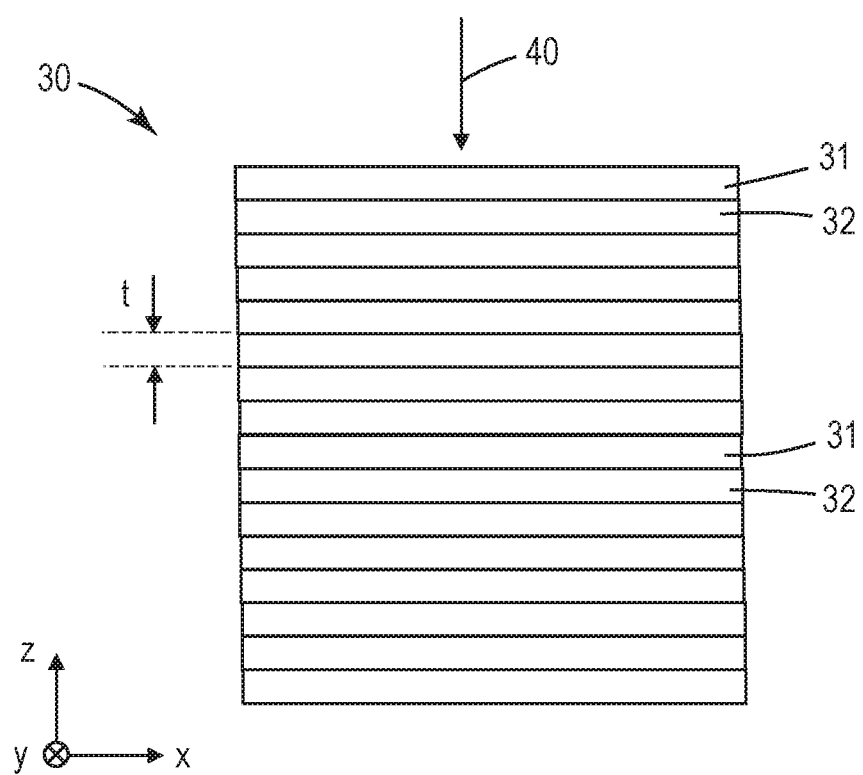
FIG. 3 schematically shows the construction of an optical film according to some embodiments.

In some embodiments, the optical film (30) disposed on the light absorbing layer (20) may be a multilayer optical film (MOF) including a plurality of layers (31, 32) as illustrated in FIG. 3, so that at least a portion of a substantially normally incident light (40) may be transmitted, polarized, and/or reflected by the plurality of optical layers (31, 32). In some instances, the plurality of layers (31, 32) may number at least 10, or at least 20, or at least 50, or at least 100 in total and each of the layers may have an average thickness (t) of less than about 300 nm, or less than about 270 nm, or less than about 250 nm. In some embodiments, the number of layers in the optical film (30) may be selected to achieve the desired optical properties using the minimum number of layers for reasons of film thickness, flexibility and economy. In the case of reflective films such as polarizers and mirrors, the number of layers may be less than about 2,000, or less than about 1,000, or less than about 750. In some embodiments, the number of layer may be at least 150 or 200. In other embodiments, the number of layer may be at least 250.

Various MOFs are generally known. MOFs generally include alternating first (31) and second (32) polymeric layers including at least one birefringent polymer (e.g. oriented semi-crystalline polymer) and one second polymer. In some aspects, the optical film (30) may be a multilayer stack having alternating first and second optical layers (31, 32) of at least two materials. In one embodiment, the materials of first and second layers (31) and (32) may be composed of polymers such as polyesters. For instance, an exemplary polymer useful as a first birefringent layer (31) in the multilayer optical film (30) may be polyethylene naphthalate (PEN). Other semicrystalline polyesters suitable as birefringent polymers as the first birefringent layer (31) in the multilayer optical film (30) may include, for example, polybutylene 2,6-naphthalate (PBN), polyethylene terephthalate (PET), or the like. The second layer (32) of the multilayer optical film (30) can be made from a variety of polymers having glass transition temperatures compatible with that of the first birefringent polymer layer (31) and having a refractive index similar to the isotropic refractive index of the first birefringent polymer layer (31). Examples of other polymers suitable for use in optical films and, particularly, in the second polymer layer (32) may include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second polymer layer (32) can be formed from homopolymers and copolymers of polyesters, polycarbonates, fluoropolymers, and polydimethylsiloxanes, and blends thereof. The layers are selected to achieve the reflection of a specific bandwidth of electromagnetic radiation. In one embodiment, the materials of the plurality of layers (31, 32) have differing indices of refraction. In some embodiments the optical film (30) may include PET as the first optical layer (31) and co polymers of PMMA (coPMMA), or any other polymer having low refractive index, including copolyesters, fluorinated polymers or combinations thereof as the second optical layer (32). The transmission and reflection characteristics of the optical film (30) is based on coherent interference of light caused by the refractive index difference between the layers (31, 32) and the thicknesses of layers (31, 32).

Figure 4:
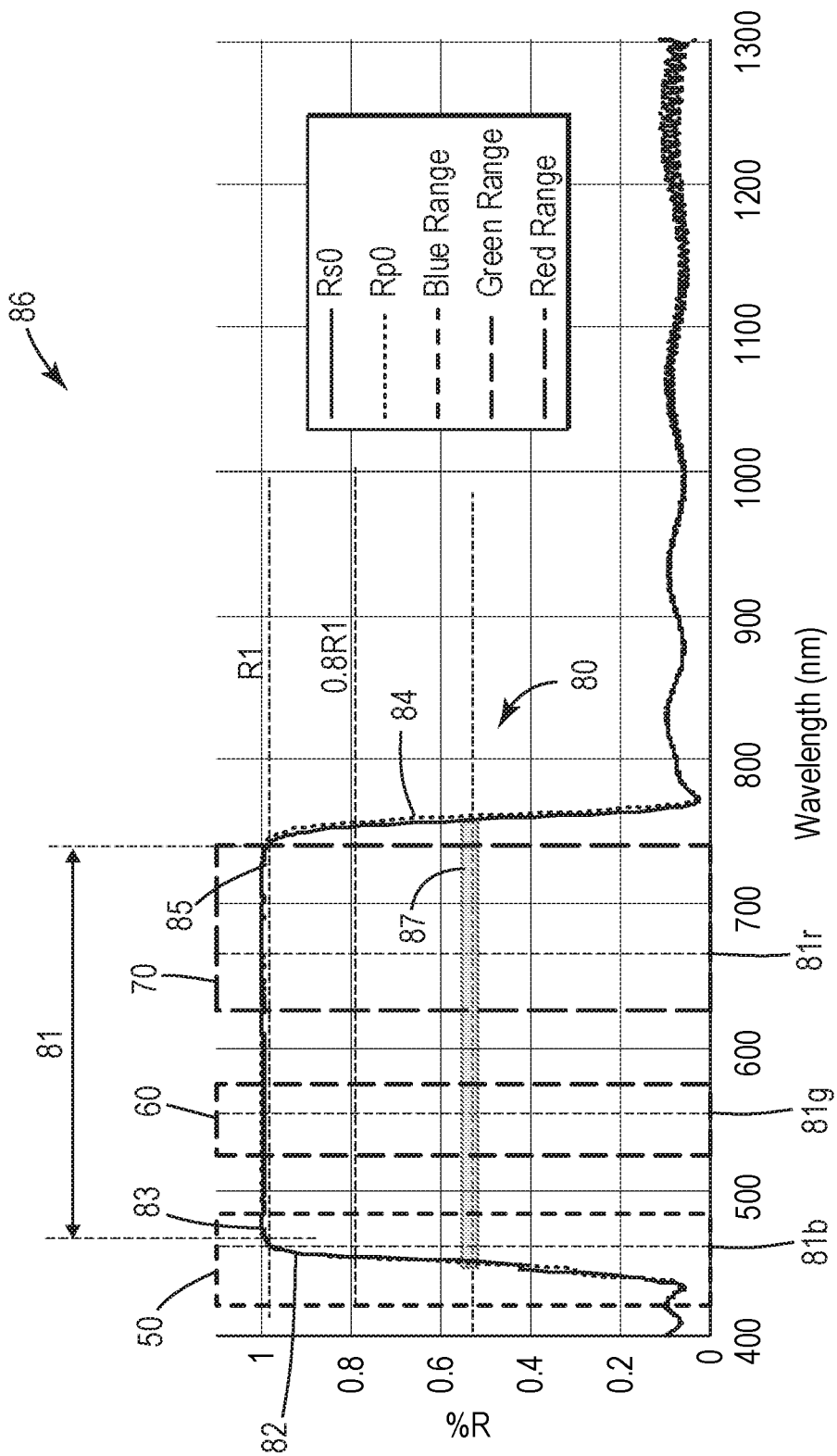
FIG. 4 graphically illustrates the reflection spectra of the mirror system according to some embodiments.

FIG. 4 graphically represents the reflection spectra of the mirror system according to some embodiments. In some aspects, for substantially normally incident light (40) (FIG. 3), and for a blue wavelength range (50), a green wavelength range (60), and a red wavelength range (70) of a visible light spectrum, the plurality of layers (31, 32) includes a reflection band (80) having a substantially flat top region (81), a left band edge (LBE) (82) at a short wavelength side (83) of the reflection band where the reflectance of the optical film (30) generally increases with increasing wavelength, and a right band edge (RBE) (84) at a long wavelength side (85) of the reflection band where the reflectance of the optical film (30) generally decreases with increasing wavelength.

In some embodiments, for a blue wavelength range (50) extending from about 420 nm to about 485 nm, the green wavelength range (60) extending from about 525 nm to about 575 nm and the red wavelength range (70) extending from about 625 nm to about 740 nm, and, for at least one polarization state, the reflection band (80) of the plurality of layers (31, 32) may include a substantially flat top region (81) having a width of at least 100 nm. The substantially flat top region (81) may include at least one green wavelength (81g) in the green wavelength range (60) and at least one red wavelength (81r) in the red wavelength range (70). In some embodiments, the substantially flat top region may be at least 150 nm wide, or 200 nm wide, or 250 nm wide. In some aspects, the at least one polarization state may include a first polarization state along a first direction (x-axis) and a second polarization state along an orthogonal second direction (y-axis).

Figure 6:
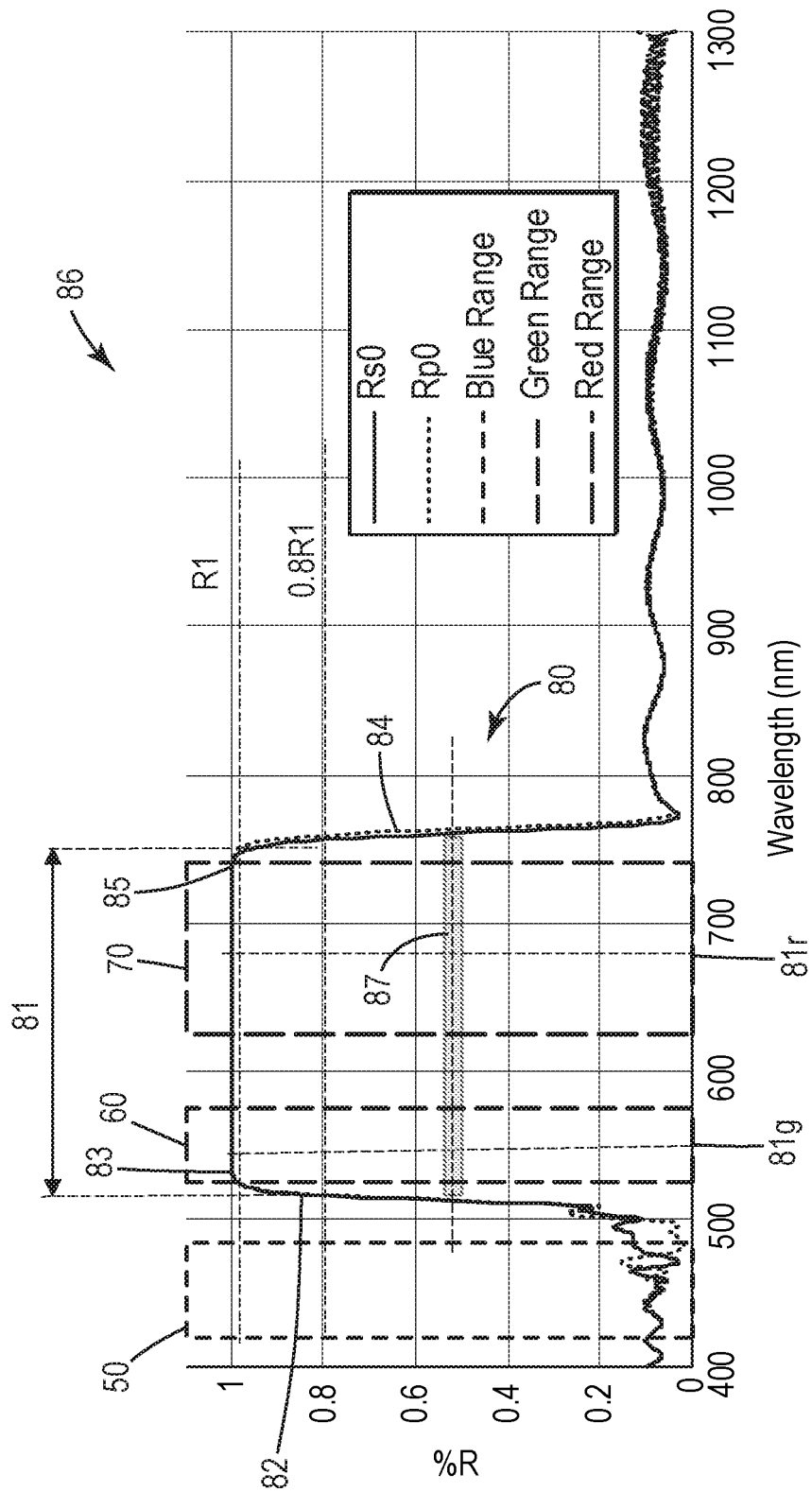

In other embodiments, the substantially flat top region (81) may include at least 80%, or at least 90% or, in some instances, greater than 95% of each of the green and red wavelength ranges. In some other embodiments, the substantially flat top region (81) may not include any wavelengths in the blue wavelength range (50), as best shown in FIG. 6.

In some embodiments, for substantially normally incident light, the substantially opaque light absorbing layer (20) may absorb at least 70% of the incident light for at least one wavelength in each of the blue, the green and the red wavelength ranges of the visible light spectrum. In other embodiments, the substantially opaque light absorbing layer (20) may absorb at least 80%, or at least 90%, or at least 95% of the incident light for at least one wavelength in each of a blue, the green and the red wavelength ranges of the visible light spectrum.

In some embodiments, the spectral reflectance of the multilayer optical film (30) of the optical stack (200) incorporated into side- or rear-view mirrors may be modified where the MOF's are substantially reflective for green and red spectral wavelengths and substantially to partially transmissive for low wavelengths. In some examples, the plurality of layers may have an average optical reflectance R1 of greater than about 70% and a standard of deviation of less than about 5% in the substantially flat top region. In other examples, R1 may be greater than about 80%, or 90%, or 95%. In some instances, an average optical reflectance Rb in the blue wavelength range may be less than about 0.8R1. In some other instances, Rb may be less than about 0.7R1, or 0.65R1, or 0.6R1 and in other instances Rb may be less than about 0.5R1, or 0.4R1, or 0.3R1, or 0.2R1, 0.1 R1.

In other embodiments, a mirror system for use in a side—(11) or rear-view (12) mirror of a vehicle (10) includes the optical stack (200) having the light absorbing layer (20) and an optical film (30) having a plurality of layers (31, 32) disposed on the light absorbing layer. For substantially normally incident light (40) and non-overlapping blue (50), green (60) and red (70) wavelength ranges of a visible light spectrum, and for at least one polarization state (x-axis), the plurality of layers (31, 32) may include a reflection spectrum (86) having a full width at half maximum (FWHM) (87) as shown in FIG. 4. The at least one polarization state in some instances may include a first polarization state along a first direction (x-axis) and a second polarization state along an orthogonal second direction (y-axis). In some aspects, each of the wavelength ranges (50, 60, 70) may be at least 30 nms, or at least 50 nms wide. In some other aspects, the non-overlapping blue, green and red wavelength ranges of the visible light spectrum may be at least 10 nm apart, or at least 20 nm apart, or at least 40 nm apart.

In some aspects, the FWHM may include at least 80% of each of the green and red wavelength ranges. In some instances, the FWHM may include at least 90%, or at least 95%, or greater than 99% of each of the green and red wavelength ranges. In other instances, the FWHM may include at most 20% of the blue wavelength range, and in some other instances the FWHM may include at most 15%, or at most 10% of the blue wavelength range.

In some embodiments, the reflection spectrum (86) may include a reflectance of at least 70%, or at least 80%, or greater than 90% for at least one wavelength (81g, 81r) in each of the green and red wavelength ranges. In some other embodiments, the light absorbing layer (20) may absorb at least 70%, or at least 80% or greater than 90% of the incident light for at least one wavelength (81b, 81g, 81r) in each of the blue, the green and the red wavelength ranges.

Figure 5:
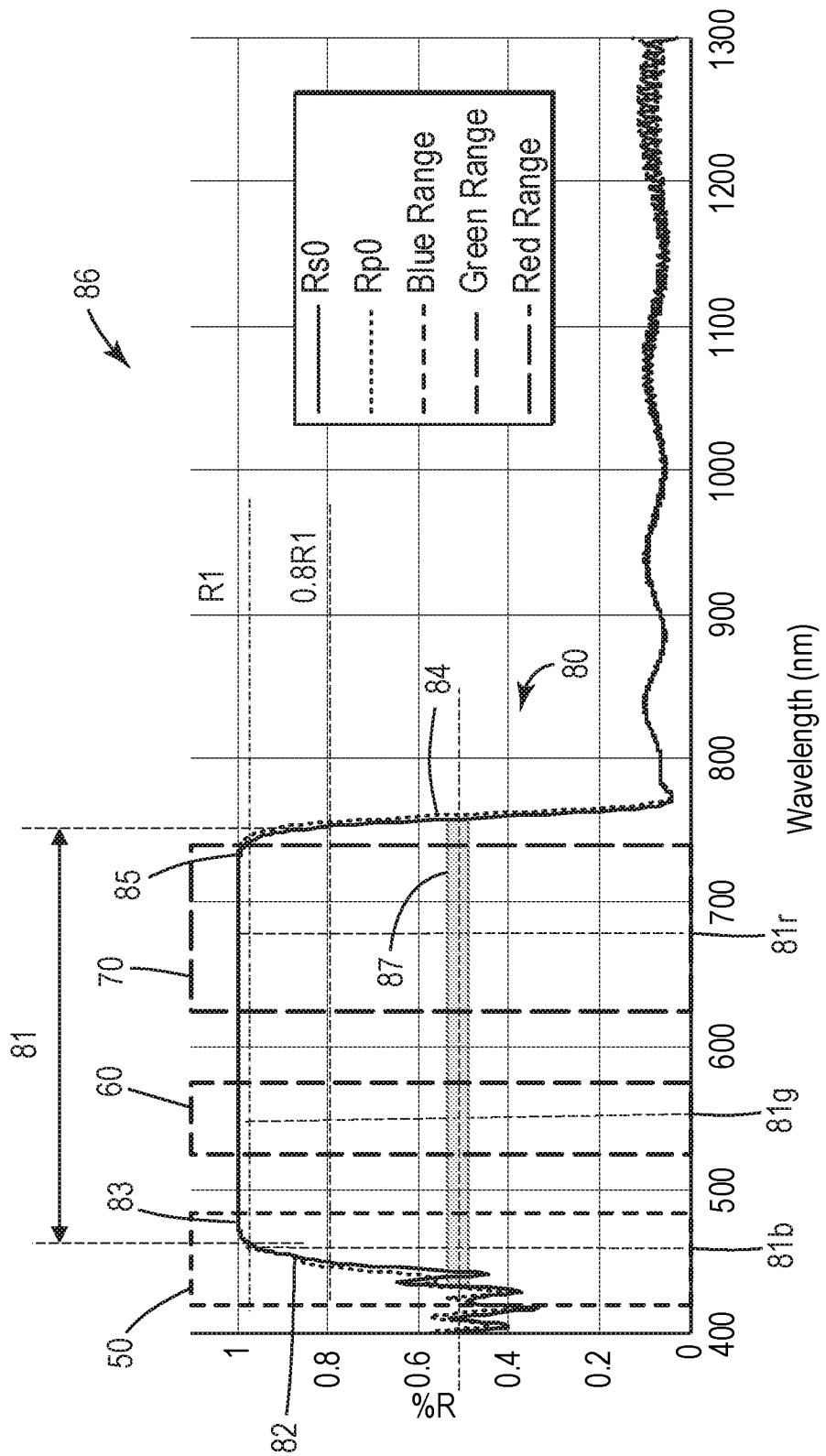
FIGS. 5-6 graphically represent other examples of reflection spectra of the mirror system according to other embodiments.

FIGS. 5-6 show different representative examples of reflection spectra of MOF's that can be employed into side- or rear-mirrors. These figures show reflection bands having various locations for the left band edge, for example, which may be adjusted by suitably selecting a thickness profile of the plurality of layers (31, 32) as generally described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example.

In some aspects, other optical filters could also be employed in combination with the multilayer optical film (30) such as light control films (e.g. 3M™ ALCF), other MOF's that are either notch filters or broad band partial mirrors or reflective polarizers to further augment a headlight spectra or the resultant reflected spectra.

The invention claimed is:

1. A mirror system for use in a side- or rear-view mirror of a vehicle, the mirror system comprising:
    a substantially opaque light absorbing layer; and
    an optical film disposed on the light absorbing layer and comprising a plurality of layers numbering at least 10 in total, each of the layers having an average thickness less than about 300 nm, such that for substantially normally incident light and a blue wavelength range extending from about 420 nm to about nm, a green wavelength range extending from about 525 nm to about 575 nm and a red wavelength range extending from about 625 nm to about 740 nm, and for at least one polarization state, the plurality of layers comprises a reflection band comprising:
    a substantially flat top region at least 100 nm wide and comprising at least one green wavelength in the green wavelength range and at least one red wavelength in the red wavelength range;
    a left band edge at a short wavelength side of the reflection band where the reflectance of the optical film generally increases with increasing wavelength, and a right band edge at a long wavelength side of the reflection band where the reflectance of the optical film generally decreases with increasing wavelength, wherein the plurality of layers has:
    an average optical reflectance R1 of greater than about 70% and a standard of deviation of less than about 5% in the substantially flat top region; and
    an average optical reflectance Rb of less than about 0.8R1 in the blue wavelength range.

2. The mirror system of claim 1, wherein the substantially flat top region is at least 150 nm wide.

3. The mirror system of claim 1, wherein for the substantially normally incident light, the substantially opaque light absorbing layer absorbs at least 70% of the incident light for at least one wavelength in each of the blue, the green and the red wavelength ranges.

4. The mirror system of claim 1, wherein the at least one polarization state comprises a first polarization state along a first direction and a second polarization state along an orthogonal second direction.

5. The mirror system of claim 1, wherein the substantially flat top region comprises at least 80% of each of the green and red wavelength ranges.

6. The mirror system of claim 1, wherein the substantially flat top region does not comprise any wavelengths in the blue wavelength range.

7. An optical stack comprising:
a light absorbing layer; and
an optical film disposed on the light absorbing layer and comprising a plurality of layers numbering at least 10 in total, each of the layers having an average thickness less than about 300 nm, such that for substantially normally incident light and non-overlapping blue, green and red wavelength ranges of a visible light spectrum, each of the wavelength ranges at least 30 nms wide, and for at least one polarization state, the plurality of layers comprises a reflection spectrum comprising a full width at half maximum FWHM, wherein:
the FWHM comprises at least 80% of each of the green and red wavelength ranges;
the FWHM comprises at most 20% of the blue wavelength range;
the reflection spectrum comprises a reflectance of at least 70% for at least one wavelength in each of the green and red wavelength ranges; and
the light absorbing layer absorbs at least 70% of the incident light for at least one wavelength in each of the blue, the green and the red wavelength ranges.

8. The optical stack of claim 7, wherein the non-overlapping blue, green and red wavelength ranges of the visible light spectrum are at least 10 nm apart, wherein the at least one polarization state comprises a first polarization state along a first direction and a second polarization state along an orthogonal second direction.

9. The optical stack of claim 7, wherein the blue wavelength range extends from about 420 nm to about 485 nm, the green wavelength range extends from about 525 nm to about 575 nm and the red wavelength range extends from about 625 nm to about 740 nm, wherein the light absorbing layer absorbs at least 70% of the incident light in each of the blue, green and red wavelength ranges, and wherein the light absorbing layer comprises a linear absorbing polarizer.

10. A mirror system for use in a side- or rear-view mirror of a vehicle, the mirror system comprising the optical stack of claim 7.

* * * * *